Feb. 4, 1969

C. B. MOORE 3,425,433

FLOW CONTROL VALVE

Filed April 20, 1966

INVENTOR
COLEMAN B. MOORE

BY B. T. Wobensmith

ATTORNEY

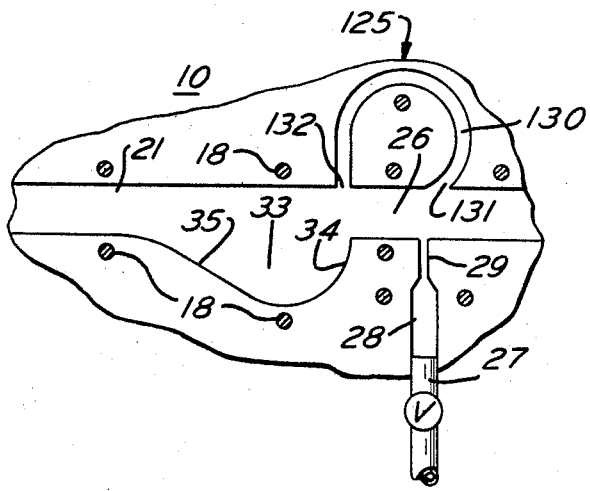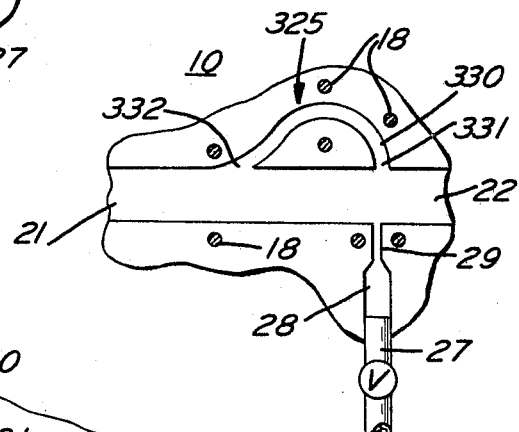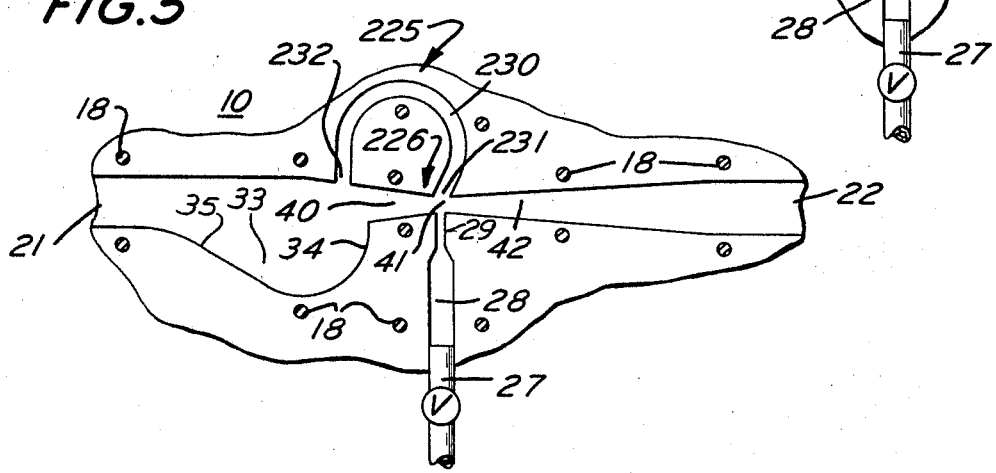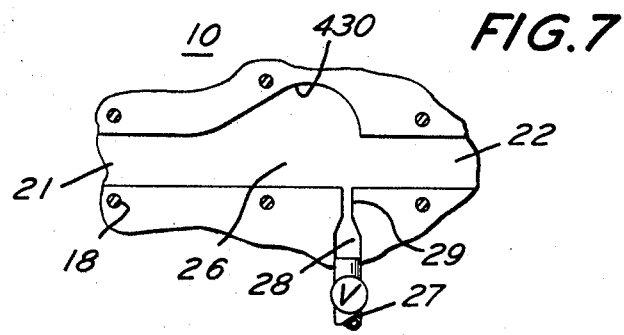

United States Patent Office 3,425,433
Patented Feb. 4, 1969

3,425,433
FLOW CONTROL VALVE
Coleman B. Moore, Uwchland, Pa., assignor to Moore Products Co., Spring House, Pa., a corporation of Pennsylvania
Filed Apr. 20, 1966, Ser. No. 543,908
U.S. Cl. 137—81.5                                8 Claims
Int. Cl. F15c 1/20, 1/14

ABSTRACT OF THE DISCLOSURE

Flow control valves with shut off of the main flow by a controlling fluid which is directed transversely of the main flow and which is then directed upstream of the location of the transverse directing so that it is added to the fluid of the main flow. The upstream action may include a second transverse of the main flow.

---

This invention relates to flow control valves and more particularly to a valve in which the flow is shut off without moving parts at the shut off location.

It is the principal object of the present invention to provide a flow control valve in which the control of the flow for shut off is effected in a simple but effective manner by the use of a controlling fluid flow, and without the necessity for employing any moving parts at the location of shut off.

It is a further object of the present invention to provide a flow control valve in which a high pressure stream is caused to flow in intersecting relation to a much larger low pressure stream to shut off the low pressure stream.

It is a further object of the present invention to provide a flow control valve with a main fluid flow stream and a control fluid flow jet and in which the control fluid is circulated or directed with respect to the main fluid flow to completely shut off the main flow, the control fluid being delivered into the main fluid.

Other objects and advantageous features of the invention will be apparent from the description and claims.

The nature and characteristic features of the invention will be more readily understood from the following description taken in connection with the accompanying drawings forming part thereof, in which:

FIG. 4 is a plan view of another form of valve in accordance with the invention;

FIG. 5 is a plan view of another form of valve in accordance with the invention;

FIG. 6 is a plan view of another form of valve in accordance with the invention; and FIG. 7 is a plan view of another form of valve in accordance with the invention.

It should, of course, be understood that the description and drawings herein are illustrative merely, and that various modifications and changes can be made in the structure disclosed without departing from the spirit of the invention.

Like numerals refer to like parts throughout the several views.

In accordance with the invention, a main fluid flow stream in enclosed relation has brought into intersecting and opposing relation thereto a control fluid at sufficiently high energy level to completely block the main fluid flow stream. The intersecting relation may include a double traverse of the main flow or a single traverse.

Figure 1:
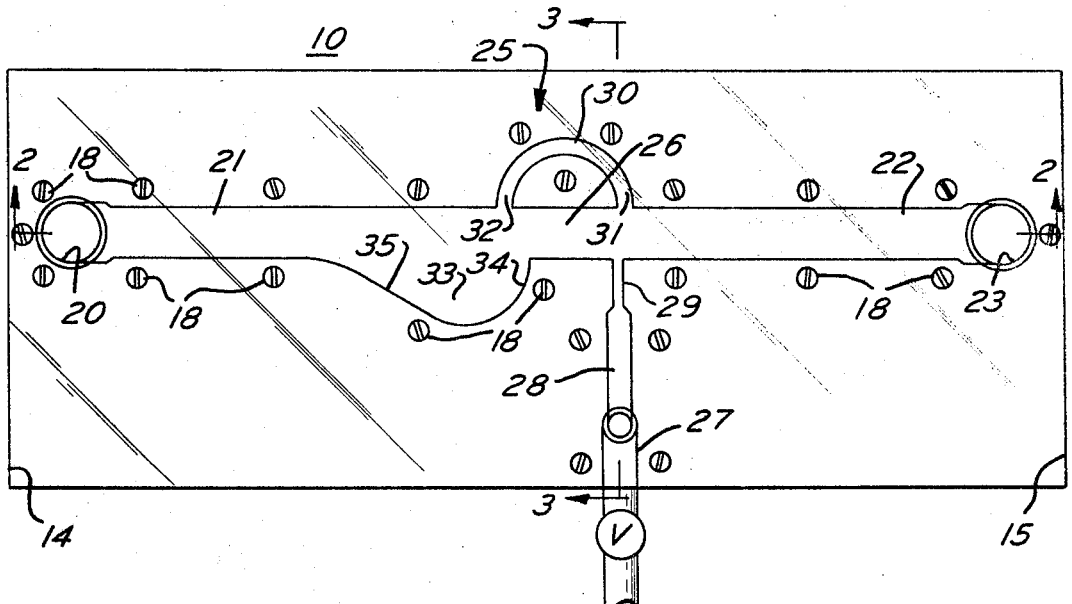
FIGURE 1 is a plan view of one form of valve in accordance with the invention.
Figure 2:
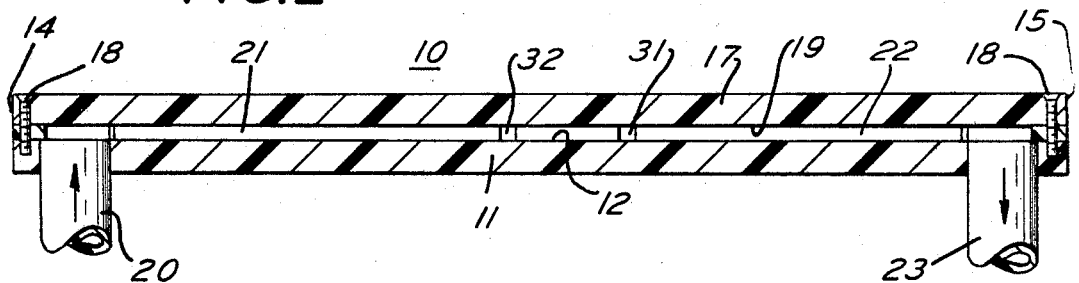
FIG. 2 is a longitudinal sectional view taken approximately on the line 2—2 of FIG. 1.
Figure 3:
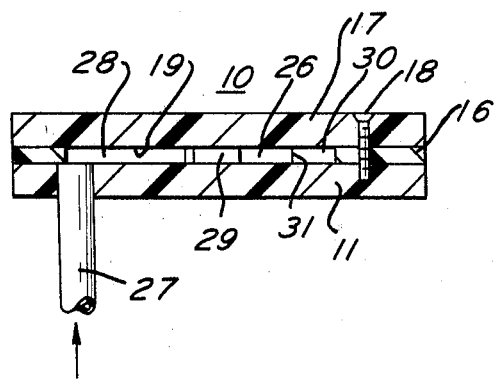
FIG. 3 is a transverse sectional view taken approximately on the line 3—3 of FIG. 1.

Referring now more particularly to FIGS. 1, 2 and 3 of the drawings, in which one embodiment of the invention is shown for double traverse, a housing assembly 10 is provided which can include a base 11 in the form of a plate with an upper face 12. The housing assembly 10 has an upstream end 14 and downstream end 15. The housing assembly 10 can be of synthetic plastic material if desired, or can be made of any other suitable material which is compatible with the fluids employed.

An intermediate pattern plate 16 can be provided with an interior shaping as hereinafter pointed out.

The base 11 and intermediate pattern plate 16 have in superposed relation a cover plate 17, a plurality of screws 18 being provided to hold the base 11, plate 16 and plate 17 in assembled relation. The cover plate 17 has a lower face 19.

At the upstream end 14, a fluid connection 20, such as a pipe, is provided which is connected to any suitable source of fluid under pressure. This source must be capable of receiving the control fluid delivery to the device, as will hereinafter appear. The fluid connection extends through the base 11 and communicates with a main fluid flow passageway 21 formed in the plate 16 and bounded by the face 12 of the base 11 and the face 19 of the cover plate 17. The main flow passageway 21 has aligned therewith a main fluid delivery passageway 22, bounded by the faces 12 and 19 from which a fluid connection 23, such as a pipe at the downstream end 15 is in communication.

Intermediate the upstream and downstream ends 13 and 14, a control zone or section 25 is provided with a passageway 26 therein connecting the passageways 21 and 22. A control fluid flow connection 27 such as a pipe, is provided connected to any suitable source of fluid under pressure, the pressure level of the source being higher than that in the fluid connection 20. The fluid connection 27 communicates with a passageway 28 formed in the plate 16 and bounded by the faces 12 and 19. The passageway 28 has a nozzle 29 bounded by the faces 12 and 19 and communicating with the passageway 28 in substantially perpendicular transversely intersecting relation to the direction of free fluid flow in the passageway 26. The control fluid flow connection 27 is provided with a valve V for controlling the fluid flow therethrough.

Opposite the nozzle 29, a return fluid passageway 30 is provided which communicates with the passageway 26 upstream. The passageway 30 has an inlet end 31 slightly downstream of the nozzle 29, and extends substantially perpendicularly from the passageway 26. The passageway 30 has a delivery end 32 in substantially perpendicular transversely intersecting relation to the direction of free flow in the passageway 26.

The passageway 26, opposite the delivery end 32 of the passageway 26, has an enlargement 33 with a curved wall portion 34 extending perpendicularly from the passageway 26 and an ogee curved wall portion 35 extending to the same side margin of the passage 26 and in a tangential or merging relation thereto.

Referring now to FIG. 4, a structure very similar to that of FIGS. 1, 2 and 3 is illustrated, the control zone or section 125 having a return passageway 130 with a greater downstream offset and with its inlet end 131 extending at an acute angle from the passageway 26 and its delivery end 132 like the end 32. The enlargement 33 is provided as before.

Referring now to FIG. 5, a modified construction is illustrated, the control section 225 there shown having a reduced or venturi fluid connection 226 with a reducing portion 40, a throat 41 and a recovery portion 42. The return passageway 230 has an inlet end 231 extending from the throat 41 at an angle downstream and its delivery end 232 to the reducing portion 40 in a direction perpendicular to the main stream free flow. The enlargement 33 is provided as before with its wall portion 34 meeting the reducing portion 40.

Referring now to FIG. 6, a further modified construction of control section 325 is shown with a single traverse of the main flow stream. No enlargement 33 is employed, the return passageway 330 having an inlet end 331 like the inlet end 31 and a delivery end 332 extending angularly or tangentially to the connection 26 and to direct the stream from the passageway 330 upstream in direct opposition to the main fluid flow stream in the passageway 26.

Referring now to FIG. 7, the construction is similar to that of FIG. 6 except that the return passageway 430 is open along the passageway 26.

The mode of operation will now be pointed out, reference being had first to FIGS. 1, 2 and 3.

Assume that valve V is closed and that fluid supplied through the inlet fluid connection 20 passes to the main flow passageways 21, 26 and 22 to the fluid connection 23.

If now it is desired to shut off the flow, the valve V is opened to supply fluid at high pressure to the passageway 28 and through the nozzle 29 and across the passageway 26 into the return passageway 30. This fluid in the return passageway 30 is then delivered across the passageway 26 and is directed by the enlargement back against the main flow stream into which it is absorbed at and upstream of the control section 25. The barrier thus set up by the control stream prevents delivery of the main stream. The control fluid in its traverses of the passageway 26 divides the pressure drop in the main flow and may entrain part of the main stream flow at those locations for delivery upstream with the control fluid.

The construction shown in FIG. 4 with its downstream offset of the inlet end 131 of the return passageway 130 accommodates greater bending of the control stream but in other respects operates in a similar manner to the device of FIGS. 1, 2 and 3.

In FIG. 5, the reduction of area in the throat 41 of the venturi section 226 reduces the area of the control stream which is subjected to the pressure of the main stream at this location so that higher main stream source pressures can be employed than with the other construction.

In FIG. 6 a simplified version of the structure of FIGS. 1, 2 and 3 is shown with a single traverse of the main flow stream by the control fluid from the nozzle 29 and direction of the control fluid into opposed relation to the main flow stream.

In FIG. 7, a still further simplified version is shown which operates in substantially the same manner as the structure of FIG. 6 for use in less demanding situations.

It will thus be seen that an improved flow control valve has been provided with which the objects of the invention are accomplished.

I claim:
1. Flow control apparatus comprising
   a housing having a fluid flow passageway therein,
   a main fluid flow supply connection connected to a source of fluid under pressure and connected to said passageway for delivering a main fluid stream therealong,
   a control fluid supply connection, and
   means for delivering the fluid from said control fluid supply connection in opposing relation to the main fluid stream for shutting off the flow of the main fluid stream in said passageway,
   said means including a member directing fluid from said control fluid supply connection transversely of said passageway,
   and a return fluid connection having an inlet portion on the opposite side of said passageway from said member and receiving the control fluid stream from said member and delivering it into said main fluid stream upstream of said member.
2. Flow control apparatus as defined in claim 1 in which
   said return fluid connection has a portion for directing the control fluid from said member transversely of said passageway.
3. Flow control apparatus as defined in claim 1 in which
   said return fluid connection has a portion for directing the control fluid from said member in opposed relation to the main fluid stream.
4. Flow control apparatus as defined in claim 1 in which
   said return fluid connection has a portion for directing the control fluid from said member transversely of said passageway, and
   said passageway has a portion for delivering the control fluid from said last portion in opposed relation to the main stream flow.
5. Flow control apparatus as defined in claim 1 in which
   said passageway has a venturi portion therein, and
   said member is disposed for transverse control fluid delivery at said venturi portion.
6. Flow control apparatus as defined in claim 5 in which
   said return fluid connection has a portion for directing the control fluid from said member transversely of said passageway, and
   said passageway has a portion for delivering the control fluid from said last portion in opposed relation to the main stream.
7. Flow control apparatus as defined in claim 1 in which
   said return fluid connection has an inlet portion downstream of said member.
8. Flow control apparatus as defined in claim 1 in which
   said return fluid connection has inlet and outlet portions one of which is at an angle with respect to the main fluid stream.

References Cited

UNITED STATES PATENTS

| 1,112,066 | 9/1914 | Hollis | 251—124 |
| 1,329,559 | 2/1920 | Tesla | 137—81.5 |
| 2,213,121 | 8/1940 | Davy | 137—81.5 |
| 2,265,737 | 12/1941 | McMahan | 137—81.5 |
| 2,692,800 | 10/1954 | Nichols et al. | 137—81.5 |
| 3,262,468 | 7/1966 | Metzger | 137—81.5 |
| 3,285,265 | 11/1966 | Boothe et al. | 137—81.5 |

M. CARY NELSON, *Primary Examiner.*

W. R. CLINE, *Assistant Examiner.*

U.S. Cl. X.R.

137—251